(12) United States Patent
Cao et al.

(10) Patent No.: US 11,677,498 B2
(45) Date of Patent: Jun. 13, 2023

(54) METHOD AND APPARATUS FOR COMMUNICATIONS

(71) Applicant: NXP USA, Inc., Austin, TX (US)

(72) Inventors: Rui Cao, Sunnyvale, CA (US); Liwen Chu, San Ramon, CA (US); Sudhir Srinivasa, Los Gatos, CA (US); Hongyuan Zhang, Fremont, CA (US); Prashant Sharma, Santa Clara, CA (US); Xiayu Zheng, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/182,091

(22) Filed: Feb. 22, 2021

(65) Prior Publication Data

US 2021/0266098 A1    Aug. 26, 2021

Related U.S. Application Data

(60) Provisional application No. 63/059,811, filed on Jul. 31, 2020, provisional application No. 63/058,992, (Continued)

(51) Int. Cl.
*H04L 1/00* (2006.01)
*H04L 1/06* (2006.01)
*H04W 84/12* (2009.01)

(52) U.S. Cl.
CPC .......... *H04L 1/0059* (2013.01); *H04L 1/0003* (2013.01); *H04L 1/0061* (2013.01);
(Continued)

(58) Field of Classification Search
CPC ... H04L 1/0643; H04L 1/0072; H04L 1/0061; H04L 1/0069; H04L 1/0059;
(Continued)

(56) References Cited

U.S. PATENT DOCUMENTS 10,079,628 B2   9/2018   Sun et al.
10,264,580 B2   4/2019   Wu et al.
(Continued)

FOREIGN PATENT DOCUMENTS

DE    102016103103 A1    2/2016

OTHER PUBLICATIONS

IEEE, "IEEE P802.11ax™/D4.3", Draft Standard for Information technology—Telecommunications and information exchange between systems Local and metropolitan area networks Specific requirements, Aug. 2019, 782 pgs.
(Continued)

*Primary Examiner* — Oussama Roudani

(57) ABSTRACT

Embodiments of a method and an apparatus for wireless communications are disclosed. In an embodiment, a method of wireless communications involves encoding bits in Extremely High Throughput (EHT) signaling fields of a packet corresponding to at least one of an Orthogonal Frequency-Division Multiple Access (OFDMA) mode, a non-OFDMA mode, and a Null Data Packet (NDP) mode, wherein EHT signaling fields include a Universal signal (U-SIG) field and an EHT signal (EHT-SIG) field, and transmitting the packet with encoded bits corresponding to at least one of the OFDMA mode, the non-OFDMA mode, and the NDP mode.

19 Claims, 14 Drawing Sheets

Related U.S. Application Data filed on Jul. 30, 2020, provisional application No. 62/994,973, filed on Mar. 26, 2020, provisional application No. 62/984,129, filed on Mar. 2, 2020, provisional application No. 62/980,204, filed on Feb. 22, 2020.

(52) U.S. Cl.
CPC .......... *H04L 1/0069* (2013.01); *H04L 1/0643* (2013.01); *H04W 84/12* (2013.01)

(58) Field of Classification Search
CPC ... H04L 1/0003; H04L 1/0045; H04L 1/0041; H04W 84/12
See application file for complete search history.

(56) References Cited

U.S. PATENT DOCUMENTS

| | | | | |
|---|---|---|---|---|
| 10,904,061 | B2* | 1/2021 | Yang | H04L 27/2613 |
| 11,096,153 | B2 | 8/2021 | Lim et al. | |
| 11,212,705 | B2 | 12/2021 | Cao et al. | |
| 2016/0285526 | A1* | 9/2016 | Hedayat | H04L 5/0037 |
| 2019/0097850 | A1* | 3/2019 | Kenney | H04L 27/2613 |
| 2020/0136884 | A1* | 4/2020 | Park | H04L 27/2665 |
| 2020/0177425 | A1* | 6/2020 | Chen | H04L 27/2608 |
| 2020/0382998 | A1 | 12/2020 | Cao et al. | |
| 2021/0045151 | A1 | 2/2021 | Chen et al. | |
| 2021/0127291 | A1 | 4/2021 | Chen et al. | |
| 2021/0135792 | A1* | 5/2021 | Cho | H04L 1/1887 |
| 2021/0250215 | A1* | 8/2021 | Lim | H04L 27/26136 |
| 2021/0258115 | A1* | 8/2021 | Liu | H04L 5/0044 |
| 2021/0266386 | A1 | 8/2021 | Cao et al. | |
| 2021/0385118 | A1* | 12/2021 | Umehara | H04W 76/10 |
| 2022/0070755 | A1* | 3/2022 | Park | H04W 48/16 |
| 2022/0095347 | A1* | 3/2022 | Huang | H04L 1/0047 |
| 2022/0330087 | A1* | 10/2022 | Lim | H04W 28/06 |

OTHER PUBLICATIONS

IEEE, "IEEE P802.11ax™/D6.0", Draft Standard for Information technology—Telecommunications and information exchange between systems Local and metropolitan area networks Specific requirements, Nov. 2019, 780 pgs.

Porat, Ron et al. "SIG-B Encoding Structure", doc. IEEE 802.11-15/0873, Jul. 13, 2015, 13 pgs.

Porat, Ron et al. "SIG-B Encoding Structure Part II", doc. IEEE 802.11-15/1059, Sep. 14, 2015, 15 pgs.

U.S. Appl. No. 17/182,075 NFOA mailed Aug. 19, 2022—21 pages.

U.S. Appl. No. 17/182,075 Final Office Action dated Feb. 10, 2023—16 pages.

* cited by examiner

FIG. 7

| FIELD | CATEGORY | SUBFIELD | NBITS |
|---|---|---|---|
| USIG | VERSION INDEPENDENT | VERSION IDENTIFIER | 3 |
| | | UL/DL | 1 |
| | | BSS COLOR | 6 |
| | | TXOP | 7 |
| | | PPDU BW | 3 |
| | VERSION DEPENDENT | PPDU FORMAT | 2 |
| | | FULL PUNCTURED CHANNEL INFO | 6 |
| | | SPATIAL REUSE | 2 |
| | | GI+LTF SIZE | 2 |
| | | NUMBER OF LTFs | 4 |
| | | NSTS | 4 |
| | | BEAMFORMED | 1 |
| | | RESERVED | 1 |
| | CRC & TAIL | CRC | 4 |
| | | TAIL | 6 |
| | | TOTAL BITS | 52 |

700

900-1

| 80MHz CPI | PUNCTURE PATTERN | NOTE |
|---|---|---|
| 0 | 996: [1 1 1 1] | 80MHz: 1 OPTION |
| 1-4 | 484+242: [1 1 x 1] | 60MHz: 4 OPTIONS |
| 5-7 | 484 (242+242): [1 1 x x] | 40MHz: 3 OPTIONS |

FIG. 9A 900-2

| 160MHz CPI | PUNCTURE PATTERN | NOTE |
|---|---|---|
| 0 | 996 + 996: [1 1 1 1][1 1 1 1] | 160MHz: 1 OPTION |
| 1-8 | 996+(484+242): [1111][11x1] | 140MHz: 8 OPTIONS |
| 21-26 | 996+484 OR (242+242): [1111][1100] | 120MHz: 6 OPTIONS |
| 27-28 | 996+0:[1111][0000] | 80MHz: 2 OPTIONS |
|  | (484+242): [11X1] | 60<80MHZ: 4 OPTIONS |
|  | (242+242): [1XX1] | 40MHz: 1 OPTION |

FIG. 9B

| 9-BIT RA | | RU ALLOCATION | ENTRIES |
|---|---|---|---|
| | 8 RA BIT | | |
| 0 | 00000000 | 26 26 26 26 26 26 26 26 26 | 1 |
| 0 | ... | ... | ... |
| 0 | 11010yyy | 996 | 8 |
| 0 | 11011yyy | | 8 |
| 0 | 111yyyyy | | 32 |
| 1 | yyyyyyyy | | 256 |

11ax ENTRIES: rows 00000000 through 11010yyy
NEW ENTRIES: rows 11011yyy through yyyyyyyy

| PREFIX | 8 BIT INDICES | #1 | #2 | #3 | #4 | #5 | #6 | #7 | #8 | #9 | NUM OF ENTRIES |
|---|---|---|---|---|---|---|---|---|---|---|---|
| 0 | 0000 0000 | 26 | 26 | 26 | 26 | 26 | 26 | 26 | 26 | 26 | 1 |
| 0 | 0000 0001 | 26 | 26 | 26 | 26 | 26 | 26 | 26 | 52 | | 1 |
| 0 | 0000 0010 | 26 | 26 | 26 | 26 | 26 | 52 | | 26 | 26 | 1 |
| 0 | 0000 0011 | 26 | 26 | 26 | 26 | 26 | 52 | | 52 | | 1 |
| 0 | 0000 0100 | 26 | 26 | 52 | | 26 | 26 | 26 | 26 | 26 | 1 |
| 0 | 0000 0101 | 26 | 26 | 52 | | 26 | 26 | 26 | 52 | | 1 |
| 0 | 0000 0110 | 26 | 26 | 52 | | 26 | 52 | | 26 | 26 | 1 |
| 0 | 0000 0111 | 26 | 26 | 52 | | 26 | 52 | | 52 | | 1 |
| 0 | 0000 1000 | 52 | | 26 | 26 | 26 | 26 | 26 | 26 | 26 | 1 |
| 0 | 0000 1001 | 52 | | 26 | 26 | 26 | 26 | 26 | 52 | | 1 |
| 0 | 0000 1010 | 52 | | 26 | 26 | 26 | 52 | | 26 | 26 | 1 |
| 0 | 0000 1011 | 52 | | 26 | 26 | 26 | 52 | | 52 | | 1 |
| 0 | 0000 1100 | 52 | | 52 | | 26 | 26 | 26 | 26 | 26 | 1 |
| 0 | 0000 1101 | 52 | | 52 | | 26 | 26 | 26 | 52 | | 1 |
| 0 | 0000 1110 | 52 | | 52 | | 26 | 52 | | 26 | 26 | 1 |
| 0 | 0000 1111 | 52 | | 52 | | 26 | 52 | | 52 | | 1 |
| 0 | 0001 0yyy | 52 | | 52 | | — | 106 | | | | 8 |
| 0 | 0001 1yyy | 106 | | | | — | 52 | | 52 | | 8 |
| 0 | 00100 yyy | 26 | 26 | 26 | 26 | 26 | 106 | | | | 8 |
| 0 | 00101 yyy | 26 | 26 | 52 | | 26 | 106 | | | | 8 |
| 0 | 00110 yyy | 52 | | 26 | 26 | 26 | 106 | | | | 8 |
| 0 | 00111 yyy | 52 | | 52 | | 26 | 106 | | | | 8 |
| 0 | 01000 yyy | 106 | | | | 26 | 26 | 26 | 26 | 26 | 8 |
| 0 | 01001 yyy | 106 | | | | 26 | 26 | 26 | 52 | | 8 |
| 0 | 01010 yyy | 106 | | | | 26 | 52 | | 26 | 26 | 8 |
| 0 | 01011 yyy | 106 | | | | 26 | 52 | | 52 | | 8 |
| 0 | 0110 zzzz | 106 | | | | — | 106 | | | | 16 |
| 0 | 0111 0000 | 52 | | 52 | | — | 52 | | 52 | | 1 |

| | | | | | | | | | |
|---|---|---|---|---|---|---|---|---|---|
| 0 | 0111 0001 | colspan="7" | 242-TONE RU EMPTY | | | | | | 1 |
| 0 | 0111 0010 | colspan="7" | 484-TONE RU EMPTY | | | | | | 1 |
| 0 | 0111 0011 | colspan="7" | 996-TONE RU EMPTY | | | | | | 1 |
| 0 | 0111 01xx | colspan="7" | DEFINITION TBD | | | | | | 4 |
| 0 | 0111 1xxx | colspan="7" | DEFINITION TBD | | | | | | 8 |
| 0 | 0111 0100 | 26 | 26 | 52 | 26 | 26 | 26 | 26 | 26 | 1 |
| 0 | 0111 0101 | 26 | 26 | 52 | 26 | 26 | 26 | 52 | | 1 |
| 0 | 0111 0110 | 26 | 26 | 52 | 26 | 52 | 26 | 26 | | 1 |
| 0 | 0111 0111 | 26 | 26 | 52 | 26 | 52 | 26 | 26 | | 1 |
| 0 | 0111 1000 | 26 | 26 | 52 | 26 | 52 | 26 | 26 | | 1 |
| 0 | 0111 1001 | 26 | 26 | 52 | 26 | 52 | 52 | | | 1 |
| 0 | 0111 1010 | 52 | 26 | 26 | 26 | 52 | 26 | 26 | | 1 |
| 0 | 0111 1011 | 52 | 52 | 26 | 52 | 26 | 26 | | | 1 |
| 0 | 0111 1100 | 26 | 26 | 26 | 26 | 26 | 106 | | | 1 |
| 0 | 0111 1101 | 26 | 26 | 52 | 26 | 106 | | | | 1 |
| 0 | 0111 1110 | 26 | 26 | 52 | 26 | 106 | | | | 1 |
| 0 | 0111 1111 | 26 | 26 | 52 | 26 | 106 | | | | 1 |
| 0 | 10 yyy yyy | 106 | | 26 | 106 | | | | | 64 |
| y | 11 0 00yyy | colspan="7" | 242 | | | | | | | 8→16 |
| y | 11 0 01yyy | colspan="7" | 484 | | | | | | | 8→16 |
| y | 11 0 10yyy | colspan="7" | 996 | | | | | | | 8→16 |
| 0 | 11 0 11yyy | colspan="7" | RESERVED | | | | | | | 8 |
| 0 | 11 0 11000 | 52 | 26 | 26 | 26 | 106 | | | | 1 |
| 0 | 11 0 11001 | 52 | 52 | 26 | 106 | | | | | 1 |
| 0 | 11 0 11010 | 106 | | 26 | 26 | 26 | 26 | 26 | | 1 |
| 0 | 11 0 11011 | 106 | | 26 | 26 | 26 | 52 | | | 1 |
| 0 | 11 0 11100 | 106 | | 26 | 52 | 26 | 26 | | | 1 |
| 0 | 11 0 11101 | 106 | | 26 | 52 | 26 | 26 | | | 1 |
| 0 | 11 0 11110 | 106 | | 26 | 52 | 26 | 26 | | | 1 |
| 0 | 11 0 11111 | 106 | | 26 | 52 | 52 | | | | 1 |

| | | | |
|---|---|---|---|
| 0 | 11 1 xxxxx | RESERVED | 32 |
| 0 | 1110xxxx | 484+242+[] | 16 |
| 0 | 1111xxxx | 484+[]+242 | 16 |
| 1 | 0000xxxx | 242+[]+484 | 16 |
| 1 | 0001xxxx | []+242+484 | 16 |
| 1 | 0010xxxx | 996+484+[] | 16 |
| 1 | 0011xxxx | 996+[]+484 | 16 |
| 1 | 0100xxxx | 484+[]+996 | 16 |
| 1 | 0101xxxx | []+484+996 | 16 |
| 1 | 0110xxxx | 484+[]+[]+242+484 | 16 |
| 1 | 0111xxxx | 484+242+[]+[]+484 | 16 |
| 1 | 1000xxxx | 996*2 | 16 |
| 1 | 1001xxxx | 996*3 | 16 |
| 1 | 10100000 | 484+242+[], zero user | 1 |
| 1 | 10100001 | 484+[]+242, zero user | 1 |
| 1 | 10100010 | 242+[]+484, zero user | 1 |
| 1 | 10100011 | []+242+484, zero user | 1 |
| 1 | 10100100 | 996+484+[], zero user | 1 |
| 1 | 10100101 | 996+[]+484, zero user | 1 |
| 1 | 10100110 | 484+[]+996, zero user | 1 |
| 1 | 10100111 | []+484+996, zero user | 1 |
| 1 | 10101000 | 996*2, zero user | 1 |
| 1 | 10101001 | 996*3, zero user | 1 |
| 1 | 1010101x | RESERVED | 2 |
| 1 | 101011xx | RESERVED | 8 |
| 1 | 1011xxxx | RESERVED | 16 |
| 1 | 111xxxxx | RESERVED | 32 |

FIG. 11C

METHOD AND APPARATUS FOR COMMUNICATIONS

CROSS-REFERENCE TO RELATED APPLICATIONS

This application is entitled to the benefit of U.S. Provisional Patent Application Ser. No. 62/980,204, filed on Feb. 22, 2020, and U.S. Provisional Patent Application Ser. No. 62/984,129, filed on Mar. 2, 2020, and U.S. Provisional Patent Application Ser. No. 62/994,973, filed on Mar. 26, 2020, and U.S. Provisional Patent Application Ser. No. 63/058,992, filed on Jul. 30, 2020, and U.S. Provisional Patent Application Ser. No. 63/059,811, filed on Jul. 31, 2020, each of which is incorporated by reference herein.

BACKGROUND

In wireless communications, devices, e.g., access point (AP) multi-link devices (MLDs) or non-AP MLDs, e.g., STA multi-link devices (STA MLDs), can transmit various types of information, such as transmission mode information, resource unit allocation (RA) information, and channel puncturing information (CPI) for communication between devices using different transmission modes. As an example, a communications device in a multi-link Basic Service Set (BSS) may wirelessly transmit a Physical layer Protocol Data Unit (PPDU) to communicate information and update device parameters. However, as the protocols for transmitting information change, there is a need to efficiently account for multiple different transmission modes.

SUMMARY

Embodiments of a method and an apparatus for wireless communications are disclosed. In an embodiment, a method of wireless communications involves encoding bits in Extremely High Throughput (EHT) signaling fields of a packet corresponding to at least one of an Orthogonal Frequency-Division Multiple Access (OFDMA) mode, a non-OFDMA mode, and a Null Data Packet (NDP) mode, wherein EHT signaling fields include a Universal signal (U-SIG) field and an EHT signal (EHT-SIG) field, and transmitting the packet with encoded bits corresponding to at least one of the OFDMA mode, the non-OFDMA mode, and the NDP mode.

In an embodiment, the EHT-SIG field uses at least one Binary Convolutional Code (BCC) code block structure which includes a cyclic redundancy check (CRC) and a tail (TAIL).

In an embodiment, for the OFDMA mode, the EHT-SIG field of the packet includes an EHT-SIG common field that is comprised of one BCC code block when a bandwidth is at most 80 MHz, wherein one BCC code block is comprised of a U-SIG Overflow bits subfield and a Resource Unit (RU) Allocation bits subfield, and wherein when the bandwidth is greater than 80 MHz, the EHT-SIG common field is comprised of two BCC code blocks that include a cyclic redundancy check (CRC) and a tail added to each BCC code block, and wherein a first BCC code block of the two BCC code blocks is comprised of a U-SIG Overflow bits subfield and a K RU Allocation subfield, and a second BCC code block of the two BCC code blocks is comprised of an (N−K) RU Allocation subfield.

In an embodiment, for the non-OFDMA mode, the EHT-SIG common field and a first user block are encoded in one BCC code block with the CRC and the tail added to the BCC code block, and wherein the EHT-SIG field of the packet fits into two Orthogonal Frequency-Division Multiplexing (OFDM) symbols with MCSO modulation.

In an embodiment, for the NDP mode, the EHT-SIG field of the packet is comprised of one BCC code block if an EHT-SIG symbol exists, and wherein the EHT-SIG field fits into one OFDM symbol for MCSO modulation.

In an embodiment, the U-SIG field of an EHT Physical layer Protocol Data Unit (PPDU) indicates EHT-SIG decoding information, and wherein EHT-SIG decoding information includes channel puncturing information (CPI).

In an embodiment, the U-SIG field of the EHT PPDU includes U-SIG PPDU format and Compression bits to indicate PPDU formats and the EHT-SIG field structure, and wherein the U-SIG PPDU format and Compression bits includes 2-bits.

In an embodiment, the EHT-SIG field of an EHT NDP PPDU is comprised of at least one of zero symbols and one symbol, and wherein the EHT-SIG field of the EHT NDP PPDU includes bits that do not fit in the U-SIG field.

In an embodiment, for the non-OFDMA mode, the EHT signaling fields uses K bits included in the U-SIG field to signal a puncturing pattern for an entire signal bandwidth.

In an embodiment, for the OFDMA mode, the EHT signaling fields include a 20 MHz bitmap to signal the puncturing pattern in each frequency block within the signal bandwidth, and wherein the 20 MHz bitmap is included in the U-SIG field.

In an embodiment, to signal an 80 MHz frequency block, the 20 MHz bitmap uses 4-bits.

In an embodiment, to signal a 160 MHz frequency block, the 20 MHz bitmap uses 8-bits.

In an embodiment, the method further includes signaling resource unit allocation (RA) information in the EHT-SIG field of the packet for at least one of multi-resource unit (RU) modes and single-RU modes.

In an embodiment, the EHT-SIG field of the packet uses a 9-bit RA table that uses 9-bits to signal at least one of the multi-RU modes and the single-RU modes.

In an embodiment, 1-bit of the 9-bit RA table is a prefix bit.

In an embodiment, the prefix bit of the 9-bit RA table is 0, and wherein 8-bits of the 9-bit RA table use entries as specified in an 802.11ax communication protocol.

In an embodiment, when the prefix bit of the 9-bit RA table is 0, an existing RA combination is utilized.

In an embodiment, the EHT-SIG field signals Modulation and Coding Scheme (MCS) using 4-bits.

An embodiment of a first wireless device is also disclosed. The first wireless device includes a processor configured to encode bits in EHT signaling fields of a packet corresponding to at least one of an OFDMA mode, a non-OFDMA mode, and a NDP mode, wherein EHT signaling fields include a U-SIG field and an EHT-SIG field, and transmit the packet with encoded bits corresponding to at least one of the OFDMA mode, the non-OFDMA mode, and the NDP mode.

Another embodiment of a method of wireless communications is disclosed. The method involves, in a punctured transmission, encoding bits in EHT signaling fields of a packet corresponding to at least one of an OFDMA mode, a non-OFDMA mode, and a NDP mode, wherein EHT signaling fields include a U-SIG field and an EHT-SIG field, and transmitting the packet with encoded bits corresponding to at least one of the OFDMA mode, the non-OFDMA mode, and the NDP mode.

Other aspects in accordance with the invention will become apparent from the following detailed description,

BRIEF DESCRIPTION OF THE DRAWINGS

FIG. 7 depicts an example of a Universal signal (U-SIG) bit table that represents encoding in accordance with an embodiment of the invention.

FIG. 9A is an example of a channel puncturing information (CPI) signaling table that depicts encoding in accordance with an embodiment of the invention.

FIG. 9B is another example of a CPI signaling table that depicts encoding in accordance with an embodiment of the invention.

FIG. 10 is an example of a 9-bit resource unit allocation (RA) signaling table that depicts encoding in accordance with an embodiment of the invention.

FIGS. 11A, 11B, and 11C are another example of a 9-bit RA signaling table that depicts encoding in accordance with an embodiment of the invention.

Throughout the description, similar reference numbers may be used to identify similar elements.

DETAILED DESCRIPTION

Figure 1:
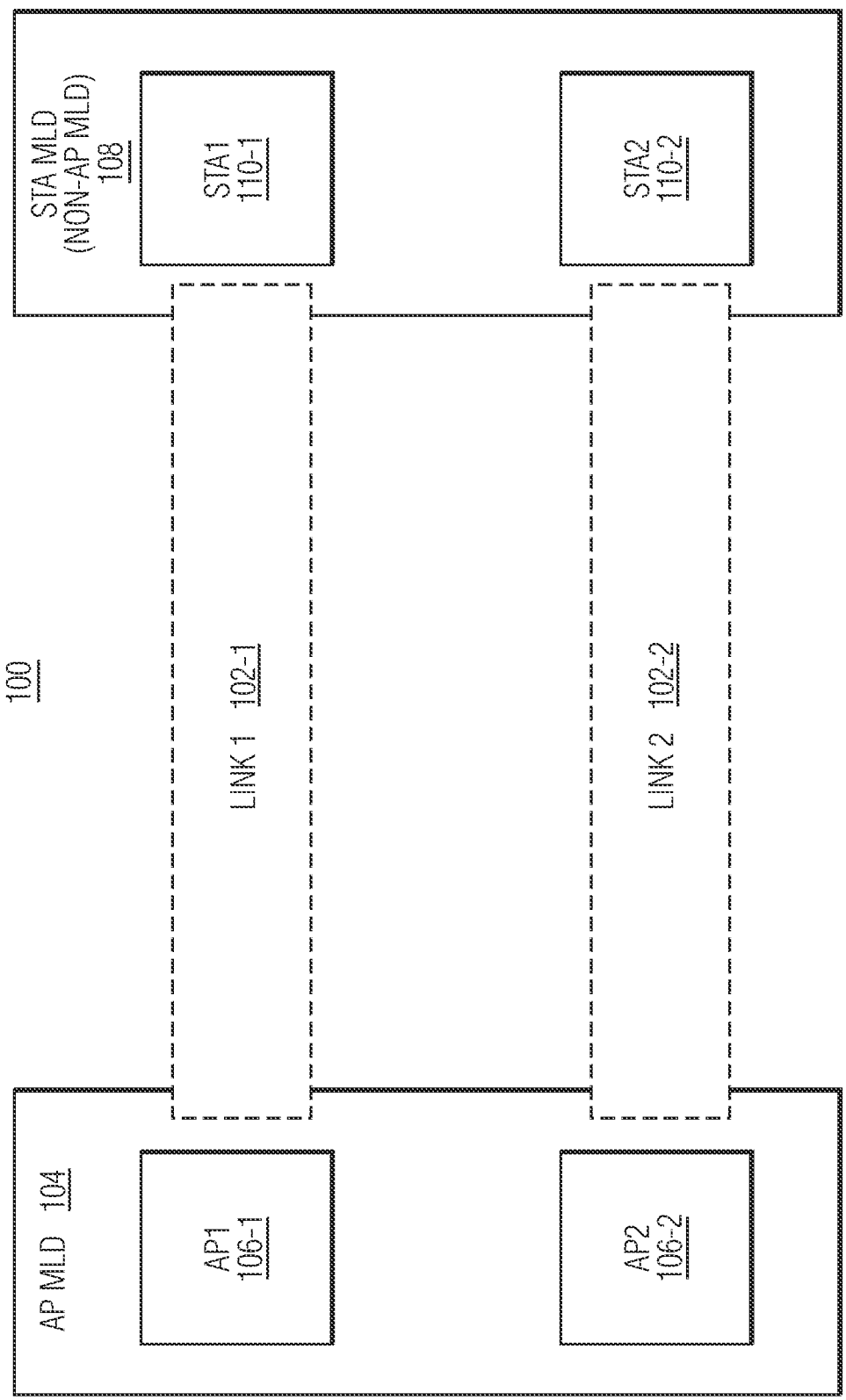
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a multi-link communications system, a multi-link device (MLD) such as an access point (AP) MLD of a wireless local area network (WLAN) transmits data to at least one associated station (STA) MLD. The AP MLD is configured to operate with associated STA MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or a next-generation communication protocol may be referred to herein as "non-legacy" features. In some embodiments of the multi-link communications system described herein, different associated STAs within range of an AP operating according to the EHT communication protocol are configured to operate according to at least one other communication protocol, which defines operation in the same frequency block as the AP, but are generally affiliated with lower data throughput protocols. The lower data throughput communication protocols (e.g., IEEE 802.11n, IEEE 802.11ac, or IEEE 802.11ax) may be collectively referred to herein as "legacy" communication protocols.

FIG. 1 depicts a multi-link communications system 100 that is used for wireless (e.g., WiFi) communications. In the embodiment depicted in FIG. 1, the multi-link communications system includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes multiple AP MLDs with one STA MLD, or multiple AP MLDs with more than one STA MLD. In another example, although the multi-link communications system is shown in FIG. 1 as being connected in a certain topology, the network topology of the multi-link communications system is not limited to the topology shown in FIG. 1. Although the system described with reference to FIG. 1 involves multi-link communications, the techniques described herein are also applicable to single-link communications. Furthermore, the techniques described herein may also be applicable to each link of a multi-link communications system.

In the embodiment depicted in FIG. 1, the AP MLD 104 includes two radios, implemented as access points (APs) 106-1 and 106-2. In such an embodiment, the APs may be AP1 106-1 and AP2 106-2. In some embodiments, the AP MLD 104 implements upper layer Media Access Control (MAC) functionalities (e.g., beacon acknowledgement establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. Each of the APs 106-1 or 106-2 of the AP MLD 104 may operate in a different frequency block. For example, the AP 106-1 may operate in a 2.4 gigahertz (GHz) frequency block and the AP 106-2 may operate in a 5 GHz frequency block. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two radios which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD is a communications device that wirelessly connects to wireless APs. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface. In some embodiments, the AP MLD 104 and/or the STA MLD 108 identifies which communication links support the multi-link operation during a multi-link operation setup phase and/or exchanges information regarding multi-link capabilities during the multi-link operation setup phase. Each of the non-AP STAs 110-1 and 110-2 of the STA MLD 108 may operate in a different frequency block. For example, the non-AP STA 110-1 may operate in the 2.4 GHz frequency block and the non-AP STA 110-2 may operate in the 5 GHz frequency block. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links, e.g., link1 102-1 and link2 102-2. For example, each of the non-AP STAs 110-1 or 110-2 communicates with an AP 106-1 or 106-2 via corresponding communication links 102-1 or 102-2. Although the STA MLD 108 is shown in FIG. 1 as including two non-AP STAs, other embodiments of the STA MLD 108 may include more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicates) with the STA MLD 108 via more than two communication links.

The EHT communication protocol (i.e., IEEE 802.11be standard) is a next version of the communications protocol that will succeed the IEEE High Efficiency (HE) 802.11ax standard. Additional future versions of the IEEE 802.11 communication protocol may succeed IEEE 802.11ax or IEEE 802.11be. It is desirable that future versions of the communication protocol provide backward compatibility and support interoperability with legacy versions of the IEEE 802.11 communication protocol. Thus, a preamble portion of a packet compliant with the IEEE 802.11be communication protocol may be distinguishable from a preamble portion of a packet that is compliant with a legacy communication protocol. As used herein, the term "packet" may refer to, for example, a Physical layer Protocol Data Unit (PPDU), or a PHY packet.

A packet, which includes a legacy preamble portion and a non-legacy preamble portion that may be transmitted by a communications device operating according to the IEEE 802.11be communication protocol to another communications device operating according to a legacy communication protocol or the IEEE 802.11be communication protocol, is described in further detail below with reference to FIG. 2.

Figure 2:
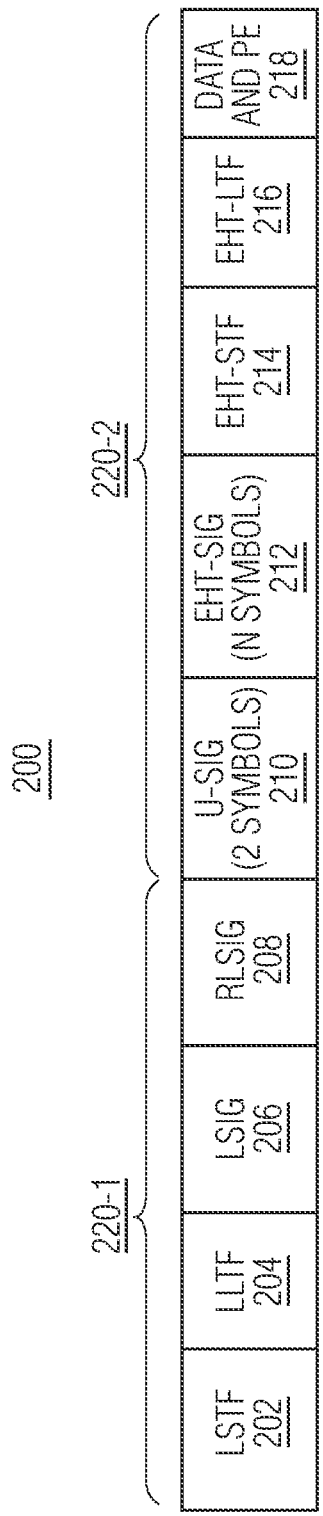
FIG. 2 depicts an example of a preamble of a packet.

FIG. 2 depicts an example of a preamble of a packet. The preamble of the packet shown in FIG. 2 may be used by a communications device operating according to the EHT communication protocol, such that the preamble of the packet signals information bits that enable coexistence for devices operating according to the EHT communication protocol, next-generation communication protocols, or legacy communication protocols. With reference to FIG. 2, one embodiment may involve a preamble 200 of a packet (entire packet not shown) including a legacy preamble portion 220-1 and a non-legacy preamble portion 220-2. In such an embodiment, the legacy preamble portion 220-1 includes a Legacy Short Training Field (L-STF) 202, a Legacy Long Training Field (L-LTF) 204, a Legacy Signal Field (L-SIG) 206, and a Repeated Legacy Signal Field (RLSIG) 208. In such an embodiment, the non-legacy preamble portion 220-2 includes a Universal signal (U-SIG) field 210 that may be 2 symbols, an EHT Signal (EHT-SIG) field 212 that may be N symbols, an EHT Short Training Field (EHT-STF) 214, an EHT Long Training Field (EHT-LTF) 216, and a Data and Packet Extension (PE) field 218. In such an embodiment, N symbols of the EHT-SIG field 212 may be an integer greater than or equal to 0. In some embodiments, the U-SIG field 210 may be used to signal information bits for the coexistence of EHT devices and next-generation devices, as well as common information bits for all users, while the EHT-SIG field 212 may be used to signal other common information bits for users and user specific information.

With reference to FIG. 2, a communications device operating according to the EHT communication protocol may transmit a packet with the preamble 200 to an associated communications device operating according to the EHT communication protocol or a legacy communication protocol. For a packet with a bandwidth greater than 20 MHz, the legacy preamble portion 220-1 and the non-legacy preamble portion 220-2 may be defined on a per channel basis and that are repeated across frequency blocks of an entire bandwidth, e.g., an entire bandwidth of 320 MHz. In some embodiments, a frequency block may be 80 MHz or 160 MHz, and the frequency block may include multiple channels, such that each channel within the frequency block may be 20 MHz or 40 MHz.

According to the EHT communication protocol and the next-generation communication protocols, the maximum supported bandwidth, number of users (e.g., STAs), and number of spatial streams (Nss) may continue to increase as more spectrum becomes available. For example, the EHT communication protocol is capable of supporting a maximum bandwidth of 320 MHz, 16 users (e.g., STAs), and 16 spatial streams. Currently, a U-SIG field (e.g., U-SIG field 210) is designed to support forward capability by including bandwidth information and other related information to signal how to decode an EHT-SIG field (e.g., EHT-SIG field 212). The EHT-SIG field includes a common field that signals resource allocation and number of users, and a user specific field that signals decoding information specific to each user (e.g., Nss, Modulation and Coding Scheme (MCS), etc.). However, the encoding structure of the EHT-SIG field needs to change to meet the requirements of the EHT communication protocol as the common field may include U-SIG overflow bits and need more RA bits for Orthogonal Frequency-Division Multiple Access (OFDMA) to support the maximum bandwidth of 320 MHz and 16 users, while the user specific field will also need more bits to support up to 16 spatial streams. An encoding technique, which is compatible with encoding structure requirements of the EHT communication protocol for EHT-SIG is described in further detail below with reference to FIG. 3.

Figure 3:
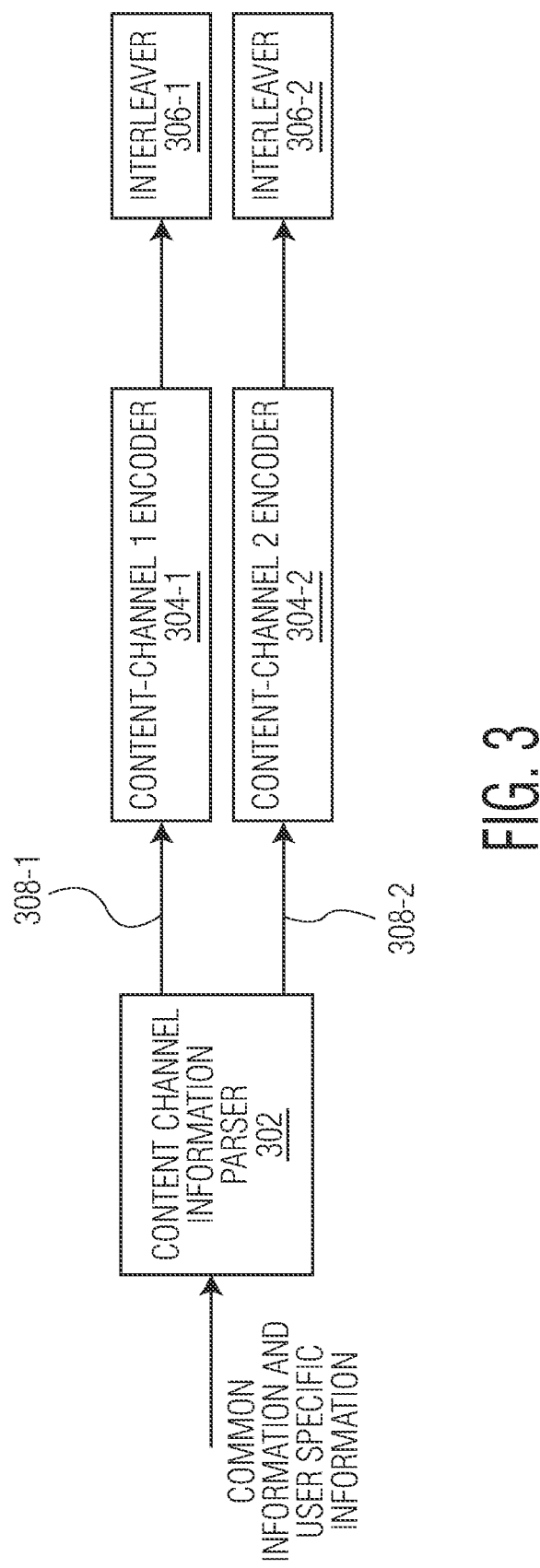
FIG. 3 illustrates an example of a technique for encoding.

FIG. 3 illustrates an example of a technique for encoding. The encoding technique illustrated in FIG. 3 may be used by a communications device operating according to the EHT communication protocol, such that the encoding technique enables coexistence for EHT devices, next-generation devices, and legacy devices. With reference to FIG. 3, encoding involves common information and user specific information (shown on left side of FIG. 3 as common information and user specific information) undergoing a parsing step, implemented via a Content channel information parser 302, an encoding step, implemented via a content-channel 1 encoder 304-1 and a content-channel 2 encoder 304-2, and an interleaving step, implemented via an interleaver 306-1 and an interleaver 306-2. In the parsing step, the common information and user specific information are partitioned or repeated by the Content channel information parser 302 into a first content channel 308-1 and a second content channel 308-2 based on frequency channel mapping and transmission mode. In some embodiments, the first content channel 308-1 includes the common information and user specific information for even 20 MHz channels (e.g., channels within a frequency block of a bandwidth with an even assigned index number) and the second content channel includes the common information and user specific information for odd 20 MHz channels (e.g., channels within the frequency block of the bandwidth with an odd assigned index number). In some embodiments, the common information and user specific information for even 20 MHz channels is partitioned into the first content channel 308-1 and undergoes encoding by the content-channel 1 encoder 304-1. In some embodiments, the common information and user specific information for odd 20 MHz channels is partitioned into the second content channel 308-2 and undergoes encoding by the content-channel 2 encoder 304-2. In some embodiments, the common information and user specific information within the first content channel 308-1 and the common information and user specific information within the second content channel 308-2 then undergo interleaving by interleaver 306-1 and interleaver 306-2, respectively. At the interleaver 306-1 and the interleaver 306-2, information within the first content channel 308-1 and information within the second content channel 308-2 are interleaved based on the number of coded bits per symbol.

With reference to FIG. 3, the common information and user specific information (shown on the left side of FIG. 3 as common information and user specific information) may be included in an EHT-SIG field (e.g., EHT-SIG field 212, FIG. 2) of a packet, which contains information for sub-channels (e.g., 20 MHz channels) within a frequency block (e.g., 80 MHz channel/segment) of a bandwidth (e.g., 160 MHz or 320 MHz). In some embodiments, the encoding structure may be similar to a High Efficiency Signal B (HE-SIGB) field of a packet in the legacy communication protocol, such that each subchannel covers odd 20 MHz channels or even 20 MHz channels. In the content channel encoders (e.g., content-channel 1 encoder and content-channel 2 encoder), the EHT-SIG field may be encoded for devices (e.g., STAs) operating according to different modes, for example, an OFDMA mode, a non-OFDMA mode, or a Null Data Packet (NDP) mode, which may each require different EHT-SIG content, length, and Binary Convolutional Code (BCC) code block structure. Consequently, according to legacy communication protocols, encoding EHT-SIG for devices operating according to different modes has become a complicated process which may increase overhead and decrease decoding reliability as the communication protocol progresses towards the EHT communication protocol and towards future communication protocols. Therefore, to efficiently encode EHT-SIG and simplify signaling for devices operating according to different modes, techniques in accordance with embodiments of the invention are described herein.

In accordance with an embodiment of the invention, a technique for wireless communications involves encoding bits in EHT signaling fields of a packet corresponding to at least one of an OFDMA mode, a non-OFDMA mode, and a NDP mode, wherein EHT signaling fields include a U-SIG field and an EHT-SIG field and transmitting the packet with encoded bits corresponding to at least one of the OFDMA mode, the non-OFDMA mode, and the NDP mode. Because bits are encoded in EHT-SIG signaling fields of the packet using different BCC code block structures, the OFDMA mode, the non-OFDMA mode, and the NDP mode can be signaled more effectively while simultaneously supporting a legacy communication protocol, an EHT communication protocol, and a next-generation communication protocol.

Techniques for wireless communications that involves encoding bits in the EHT-SIG field of the packet for the OFDMA mode, the non-OFDMA mode, or the NDP mode, and then transmitting the packet is described in further detail below with reference to FIG. 4, FIG. 5, and FIG. 6. In some embodiments, the techniques described herein are applicable to multi-link wireless communications and multi-link wireless communications devices while in other embodiments, the techniques described herein are applicable to single-link wireless communications and single-link wireless communications devices.

Figure 4:
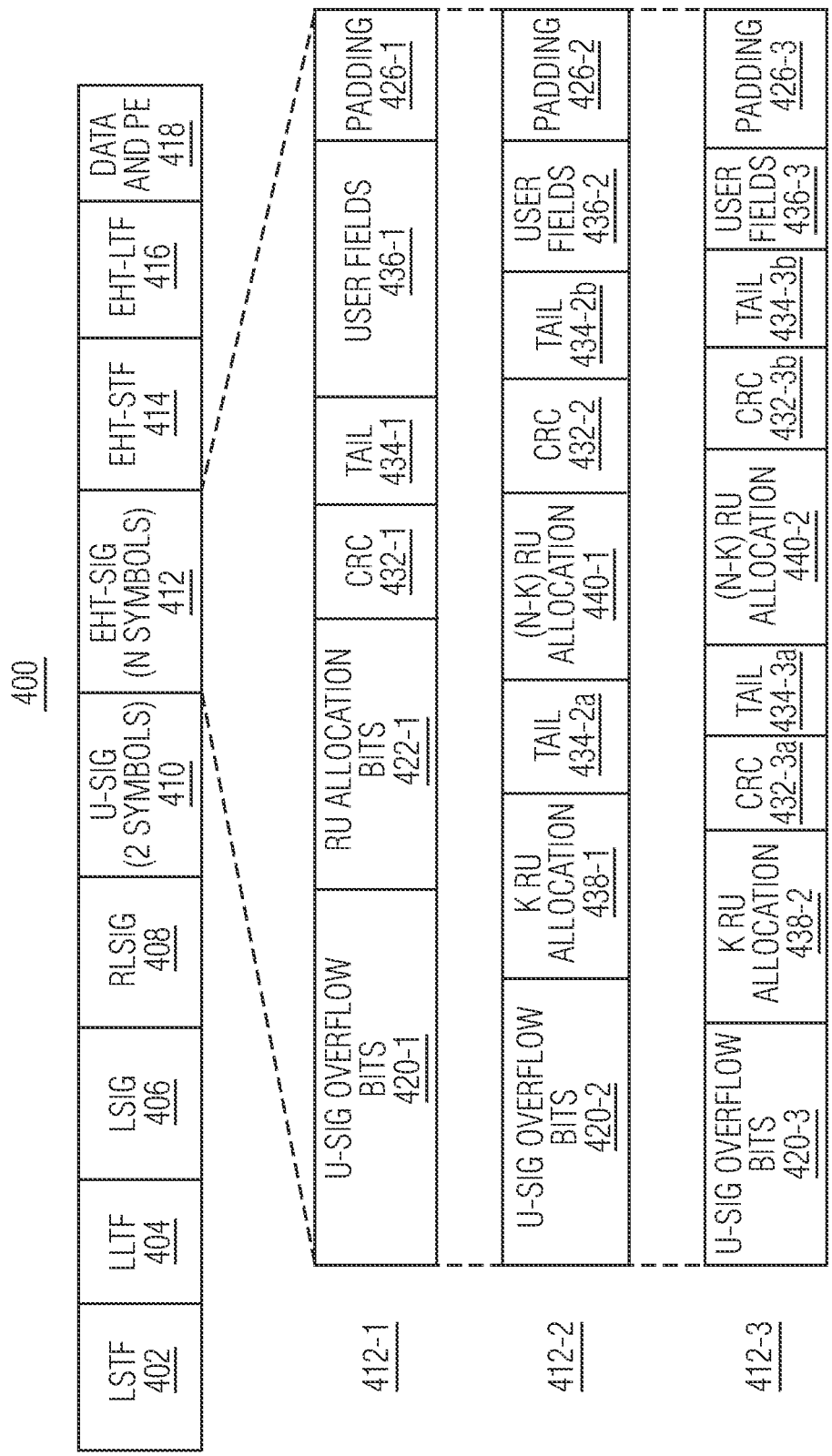
FIG. 4 depicts examples of an Extremely High Throughput Signal (EHT-SIG) field of a packet in accordance with an embodiment of the invention.

FIG. 4 depicts examples of an EHT-SIG field of a packet in accordance with an embodiment of the invention. In particular, FIG. 4 depicts encoding structures of the EHT-SIG field that may be implemented in the content channel encoder as shown in FIG. 3 for the OFDMA mode when transmitted in a packet. With reference to FIG. 4, a preamble 400 of a packet (entire packet not shown) includes an LSTF field 402, an LLTF field 404, an LSIG field 406, an RLSIG field 408, a U-SIG field 410 that may be 2 symbols, an EHT-SIG field 412 that may be N symbols, an EHT-STF field 414, an EHT-LTF field 416, and a Data and PE field 418. In some embodiments, N symbols of the EHT-SIG field 412 may be an integer of at least 2. In such an embodiment, the EHT-SIG field 412 may include one of three encoding structures, implemented as a first EHT-SIG OFDMA encoding structure 412-1, a second EHT-SIG OFDMA encoding structure 412-2, and a third EHT-SIG OFDMA encoding structure 412-3.

In the first EHT-SIG OFDMA encoding structure 412-1, the EHT-SIG field 412 may include U-SIG Overflow bits 420-1, a RU Allocation Bits subfield 422-1, a cyclic redundancy check (CRC), 432-1, a TAIL, 434-1, User fields 436-1, and Padding, 426-1. In the first EHT-SIG OFDMA encoding structure 412-1, User fields 436-1 may include user blocks (not shown) with user specific information for each user in a bandwidth. In some embodiments, CRC and TAIL bits are added after each set of two user blocks included in User fields 436-1, except when an odd number of user blocks exist. In some embodiments, when an odd number of user blocks exist, CRC and TAIL bits are also added after the last user block.

In the second EHT-SIG OFDMA encoding structure 412-2, the EHT-SIG field 412 may include U-SIG Overflow bits 420-2, a K RU Allocation subfield 438-1, a first TAIL, 434-2a, an (N–K) RU Allocation subfield 440-1, a CRC, 432-2, a second TAIL, 434-2b, User fields 436-2, and Padding, 426-2. In the second EHT-SIG OFDMA encoding structure 412-2, User fields 436-2 may include user blocks (not shown) with user specific information for each user in the bandwidth. In some embodiments, CRC and TAIL bits are added after each set of two user blocks included in User fields 436-2, except when an odd number of user blocks exist. In some embodiments, when an odd number of user blocks exist, CRC and TAIL bits are also added after the last user block.

In the third EHT-SIG OFDMA encoding structure 412-3, the EHT-SIG field 412 may include U-SIG Overflow bits 420-3, a K RU Allocation subfield 438-2, a first CRC, 432-3a, a first TAIL, 434-3a, an (N–K) RU Allocation subfield 440-2, a second CRC, 432-3b, a second TAIL, 434-3b, User fields 436-3, and Padding, 426-3. In the third EHT-SIG OFDMA encoding structure 412-3, User fields 436-3 may include user blocks (not shown) with user specific information for each user in the bandwidth. In some embodiments, CRC and TAIL bits are added after each set of two user blocks included in User fields 436-3, except when an odd number of user blocks exist. In some embodiments, when an odd number of user blocks exist, CRC and TAIL bits are also added after the last user block. In some embodiments, an OFDMA mode may be distinguished from a non-OFDMA mode and an NDP mode using PPDU format and Compression bits in the U-SIG field.

With reference to FIG. 4, in some embodiments, U-SIG Overflow bits (e.g., U-SIG Overflow bits 420-1, U-SIG Overflow bits 420-2, and U-SIG Overflow bits 420-3) may include 17-bits. In some embodiments, encoding of the user blocks included in, for example, User fields 436-1, User fields 436-2, or User fields 436-3, may be in accordance with the 802.11ax communication protocol, such that every two user blocks are encoded together (e.g., 46-bits+10-bits CRC+TAIL). In such an embodiment, if an odd number of users exist, then the last user will be encoded separately.

With further reference to FIG. 4, when the bandwidth is at most 80 MHz (e.g., 20 MHz, 40 MHz, or 80 MHz), U-SIG Overflow bits 420-1 and RU Allocation Bits 422-1 of the first EHT-SIG OFDMA encoding structure 412-1 may be padded with the CRC 432-1 and the TAIL 434-1 after RU Allocation Bits 422-1, and may be jointly encoded. In some embodiments, U-SIG Overflow bits 420-1 and RU Allocation Bits 422-1 of the first EHT-SIG OFDMA encoding structure 412-1 may be identified as components of an EHT-SIG common field of the EHT-SIG field 412. In some embodiments, the EHT-SIG common field of the first EHT-SIG OFDMA encoding structure 412-1 may include a BCC code block structure that has one BCC code block that may be of varying length. In such an embodiment, the BCC code block may include the EHT-SIG common field (e.g., U-SIG Overflow bits 420-1 and RU Allocation Bits 422-1) of the first EHT-SIG OFDMA encoding structure 412-1.

With further reference to FIG. 4, in some embodiments, RU Allocation Bits (e.g., K RU Allocation subfield 438-1 and (N–K) RU Allocation subfield 440-1) of the second EHT-SIG OFDMA encoding structure 412-2 may include 9*N bits, such that N=floor(bandwidth/40). In such an embodiment, when the bandwidth is 20 MHz, 40 MHz, or 80 MHz, RU Allocation Bits (e.g., K RU Allocation subfield 438-1 and (N–K) RU Allocation subfield 440-1) of the second EHT-SIG OFDMA encoding structure 412-2 may include 9-bits, 9-bits, or 18-bits, respectively. In such an embodiment, when the bandwidth is 160 MHz, RU Allocation Bits (e.g., K RU Allocation subfield 438-1 and (N–K) RU Allocation subfield 440-1) of the second EHT-SIG OFDMA encoding structure 412-2 may include 36-bits. In such an embodiment, when the bandwidth is 320 MHz, RU Allocation Bits (e.g., K RU Allocation subfield 438-1 and (N–K) RU Allocation subfield 440-1) of the second EHT-SIG OFDMA encoding structure 412-2 may include 72-bits.

With further reference to FIG. 4, when the bandwidth is greater than 80 MHz (e.g., 160 MHz or 320 MHz), U-SIG overflow bits 420-3 and the K RU Allocation subfield 438-2 of the third EHT-SIG OFDMA encoding structure 412-3 may be padded with the first CRC 432-3*a* and the first TAIL 434-3*a*, while the (N–K) RU Allocation subfield 440-2 may be padded with the second CRC 432-3*b* and the second TAIL 434-3*b*, each of which may be jointly encoded. In such an embodiment, the first CRC 432-3*a* and the second CRC 432-3*b* are the CRCs for U-SIG Overflow bits 420-3 and RU Allocation Bits (e.g., K RU Allocation subfield 438-2 and (N–K) RU Allocation subfield 440-2) of the third EHT-SIG OFDMA encoding structure 412-3. In some embodiments, K of the K RU Allocation subfield 438-2 may be equal to 2, such that when the bandwidth is 320 MHz, there may be two BCC code blocks. In some embodiments, K of the K RU Allocation subfield 438-2 may be equal to 4, such that when the bandwidth is 160 MHz, there may be one BCC code block. In some embodiments, U-SIG Overflow bits 420-3, the K RU Allocation subfield 438-2, and the (N–K) RU Allocation subfield 440-2 of the third EHT-SIG OFDMA encoding structure 412-3 may be identified as components of the EHT-SIG common field of the EHT-SIG field 412. In some embodiments, the EHT-SIG common field of the third EHT-SIG OFDMA encoding structure 412-3 may include a BCC code block structure that has two BCC code blocks that may be of varying lengths. In such an embodiment, the two BCC code blocks may include the EHT-SIG common field of the third EHT-SIG OFDMA encoding structure 412-3, such that a first BCC code block may include U-SIG Overflow bits 420-3 and the K RU Allocation subfield 438-2 of the third EHT-SIG OFDMA encoding structure 412-3, while a second BCC code block may include the (N–K) RU Allocation subfield 440-2 of the third EHT-SIG OFDMA encoding structure 412-3. In such an embodiment, the first BCC code block and the second BCC code block are separated by the first CRC 432-3*a* and the first TAIL 434-3*a*.

Figure 5:
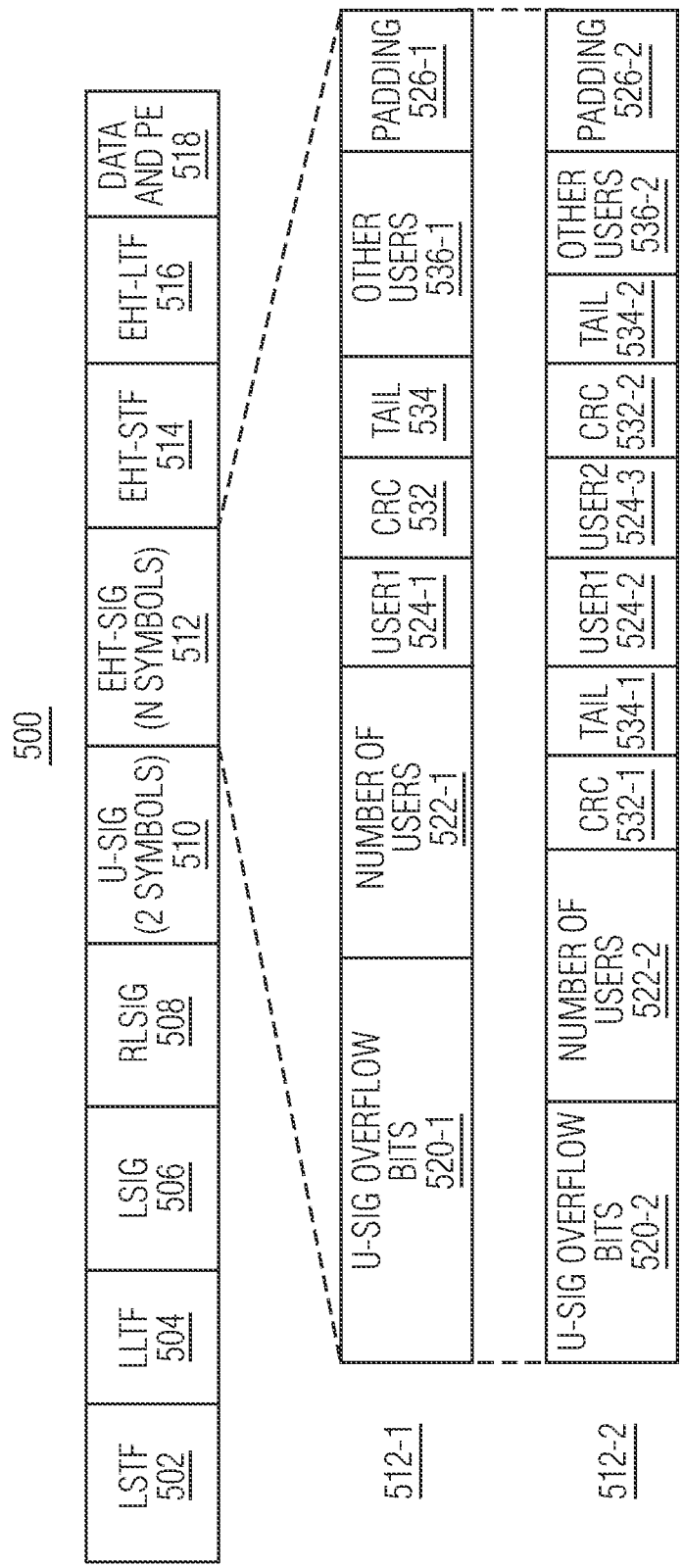
FIG. 5 depicts additional examples of an EHT-SIG field of a packet in accordance with an embodiment of the invention.

FIG. 5 depicts additional examples of an EHT-SIG field of a packet in accordance with an embodiment of the invention. In particular, FIG. 5 depicts encoding structures of the EHT-SIG field that may be implemented in the content channel encoder as shown in FIG. 3 for the non-OFDMA mode when transmitted in a packet. With reference to FIG. 5, a preamble 500 of a packet (entire packet not shown) includes an LSTF field 502, an LLTF field 504, an LSIG field 506, an RLSIG field 508, a U-SIG field 510 that may be 2 symbols, an EHT-SIG field 512 that may be N symbols, an EHT-STF field 514, an EHT-LTF field 516, and a Data and PE field 518. In some embodiments, N symbols of the EHT-SIG field 512 that may be an integer of at least 2. In such an embodiment, the EHT-SIG field 512 may include one of two encoding structures, implemented as a first EHT-SIG non-OFDMA encoding structure 512-1 and a second EHT-SIG non-OFDMA encoding structure 512-2.

In the first EHT-SIG non-OFDMA encoding structure 512-1, the EHT-SIG field 512 may include U-SIG Overflow bits 520-1, the Number of Users subfield 522-1, a first user block, implemented as User1 524-1, a CRC 532, a TAIL 534, a second user block, implemented as Other users 536-1, and Padding, 526-1. In the first EHT-SIG non-OFDMA encoding structure 512-1, Other users 536-1 may include user blocks (not shown) with user specific information for each user in a bandwidth. In some embodiments, CRCs and TAILs may be added for every two user blocks included in Other users 536-1.

In the second EHT-SIG non-OFDMA encoding structure 512-2, the EHT-SIG field 512 may include U-SIG Overflow bits 520-2, the Number of Users subfield 522-2, a first CRC 532-1, a first TAIL 534-1, a first set of user blocks, implemented as User1 524-2 and User2 524-3, a second CRC 532-2, a second TAIL 534-2, a second set of user blocks, implemented as Other users 536-2, and Padding, 526-2. In the second EHT-SIG non-OFDMA encoding structure 512-2, Other users 536-2 may include user blocks (not shown) with user specific information for each user in the bandwidth. In some embodiments, CRCs and TAILs may be added for every two user blocks included in Other users 536-2. In some embodiments, the non-OFDMA mode may be distinguished from the OFDMA mode and the NDP mode using PPDU format and Compression bits in the U-SIG field.

With reference to FIG. 5, in some embodiments, U-SIG Overflow bits 520-1 of the first EHT-SIG non-OFDMA encoding structure 512-1 may include 17-bits. In some embodiments, the Number of Users subfield 522-1 of the first EHT-SIG non-OFDMA encoding structure 512-1 may include 3-bits. In such an embodiment, U-SIG Overflow bits 520-1 and the Number of Users subfield 522-1 make up an EHT-SIG common field of the EHT-SIG field 512, such that the EHT-SIG common field may be 20-bits.

With further reference to FIG. 5, when the bandwidth is at most 80 MHz (e.g., 20 MHz, 40 MHz, or 80 MHz), the EHT-SIG common field of the EHT-SIG field 512 in the first EHT-SIG non-OFDMA encoding structure 512-1 may include U-SIG Overflow bits 520-1 and the Number of Users subfield 522-1. In such an embodiment, the EHT-SIG common field of the first EHT-SIG non-OFDMA encoding structure 512-1 and one user block (e.g., User1 524-1) may be appended with the CRC 532 and the TAIL 534, and may be encoded together (e.g., 42-bits+10-bits CRC+TAIL). In some embodiments, when there is one user (e.g., STA), there may be one BCC code block that includes the EHT-SIG common field (e.g., U-SIG Overflow bits 520-1 and the Number of Users subfield 522-1) and one user block (e.g., User1 524-1). In some embodiments, the second user block (e.g., Other users 536-1) may be encoded based on one BCC code block for every two user blocks. In some embodiments, when the EHT-SIG field 512 is encoded using the first EHT-SIG non-OFDMA encoding structure 512-1, the EHT-SIG field 512 may fit into two Orthogonal Frequency-Division Multiplexing (OFDM) symbols with MCS0 modulation.

With further reference to FIG. 5, when the bandwidth is greater than 80 MHz (e.g., 20 MHz, 40 MHz, or 80 MHz), the EHT-SIG common field of the EHT-SIG field 512 in the second EHT-SIG non-OFDMA encoding structure 512-2 may include U-SIG Overflow bits 520-2 and the Number of Users subfield 522-2. In such an embodiment, the EHT-SIG common field of the second EHT-SIG non-OFDMA encoding structure 512-2 may be appended with the first CRC 532-1 and the first TAIL 534-1, and may be encoded together. In some embodiments, when there is more than one user (e.g., STA), there may be one BCC code block that includes the EHT-SIG common field (e.g., U-SIG Overflow bits 520-2 and the Number of Users subfield 522-2) and a second BCC code block that includes two user blocks (e.g., User1 524-2 and User2 524-3). In some embodiments, there may be another BCC code block for every two user blocks in Other users 536-2 that are each appended with a corresponding CRC+TAIL. In some embodiments, when the EHT-SIG field 512 is encoded using the second EHT-SIG non-OFDMA encoding structure 512-2, the EHT-SIG field 512 may fit into two OFDM symbols with MCSO modulation.

Figure 6:
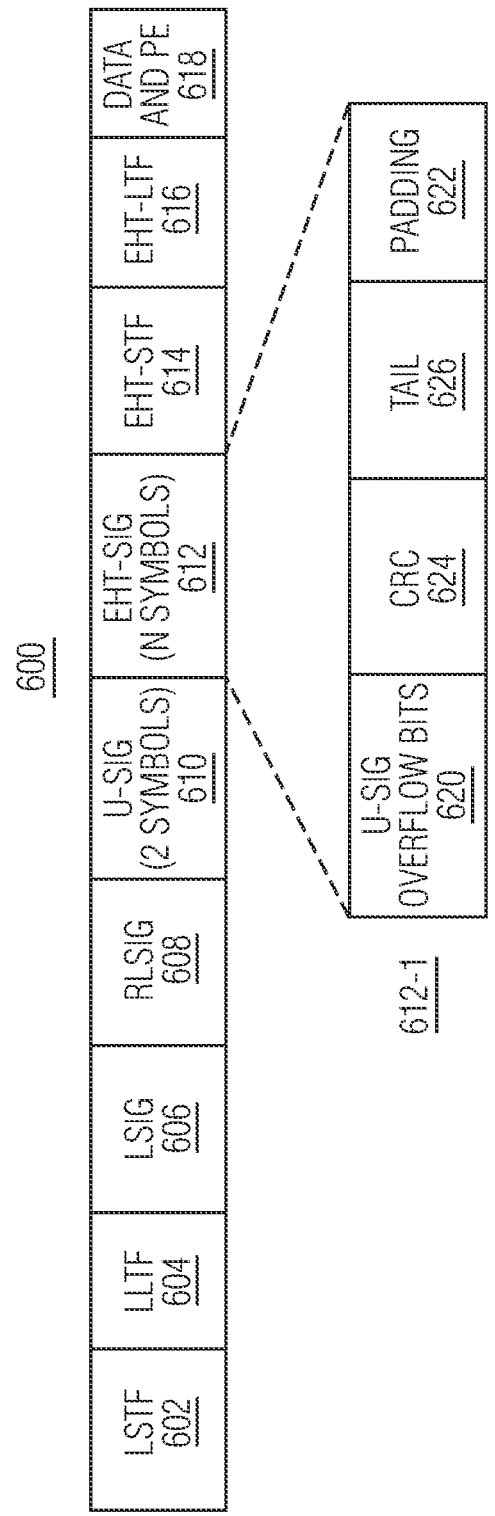
FIG. 6 depicts an additional example of an EHT-SIG field of a packet in accordance with an embodiment of the invention.

FIG. 6 depicts an additional example of an EHT-SIG field of a packet in accordance with an embodiment of the invention. In particular, FIG. 6 depicts an encoding structure of the EHT-SIG field that may be implemented in the content channel encoder as shown in FIG. 3 when transmitting an EHT PPDU for sounding NDP. With reference to FIG. 6, a preamble 600 of a packet (entire packet not shown) includes an LSTF field 602, an LLTF field 604, an LSIG field 606, an RLSIG field 608, a U-SIG field 610 that may be 2 symbols, an EHT-SIG field 612 that may be N symbols, an EHT-STF field 614, an EHT-LTF field 616, and a Data and PE field 618. In some embodiments, N symbols of the EHT-SIG field 612 that may be an integer of 0 or 1. In such an embodiment, the EHT-SIG field 612 may include an encoding structure, implemented as EHT-SIG NDP encoding structure 612-1.

In EHT-SIG NDP encoding structure 612-1, the EHT-SIG field 612 may include U-SIG Overflow bits 620, a CRC 624, a TAIL 626, and Padding 622. In some embodiments, the NDP mode may be distinguished from the OFDMA mode and the non-OFDMA by a compressed EHT-SIG mode bit in the U-SIG field.

With reference to FIG. 6, in some embodiments, an EHT-SIG common field of the EHT-SIG NDP encoding structure 612-1 for the EHT-SIG field 612 may include U-SIG Overflow bits 620, such that the number of bits in U-SIG Overflow bits 620 of EHT-SIG NDP encoding structure 612-1 may be limited. In some embodiments, U-SIG Overflow bits 620 of EHT-SIG NDP encoding structure 612-1 may include 16-bits. In some embodiments, the EHT-SIG common field of EHT-SIG NDP encoding structure 612-1 for the EHT-SIG field 612 may include U-SIG Overflow bits 620. In some embodiments, the EHT-SIG common field of EHT-SIG NDP encoding structure 612-1 for the EHT-SIG field 612 may include 16-bits.

With further reference to FIG. 6, if an EHT-SIG symbol exists, EHT-SIG NDP encoding structure 612-1 for the EHT-SIG field 612 may include one BCC code block. In such an embodiment, the BCC code block may include U-SIG Overflow bits 620 with the CRC 624 and the TAIL 626 which may be encoded together and appended by Padding 622. In such an embodiment, all coded bits of the EHT-SIG field 612 may fit into one OFDM symbol for MCSO modulation.

With further reference to FIG. 6, the preamble 600 of the packet may be a new PPDU format or mode defined for EHT NDP signaling, saving NDP overhead. In such an embodiment, an EHT NDP PPDU may have a fixed format and no data symbols, for example, a fixed preamble size and PE length. In such an embodiment, the EHT NDP PPDU will have 0 or 1 symbol in the EHT-SIG field 612. In such an embodiment, when the EHT NDP PPDU has 1 symbol in the EHT-SIG field 612, the EHT NDP format may use fixed MCSO modulation. In some embodiments, the U-SIG field 610 and the EHT-SIG field 612 in the EHT NDP format may be jointly designed with the same per-20 MHz channel modulation. In some embodiments, bits that may not fit into the U-SIG field 610 may be signaled in the EHT-SIG field 612. Different from a regular data PPDU, the EHT-SIG related fields (e.g., EHT-SIG symbol number, EHT-SIG MCS, EHT-SIG compression, etc.) may be repurposed for EHT NDP PPDU signaling and a STA_ID may not need to be included in the signaling. In such an embodiment, the U-SIG field 610 may be used to encode information for the EHT-SIG related fields in an EHT NDP transmission. An example of a bit table for the U-SIG field that encodes information for EHT-SIG related fields in the EHT NDP transmission is described in further detail below with reference to FIG. 7.

FIG. 7 depicts an example of a U-SIG bit table that represents encoding in accordance with an embodiment of the invention. In particular, FIG. 7 depicts a table that represents U-SIG field encoding that may be implemented in a U-SIG field (e.g., U-SIG field 610) of an EHT PPDU as shown in FIG. 6. With reference to FIG. 7, the U-SIG bit table 700 includes a first column for a corresponding PPDU field, a second column for a corresponding PPDU field category, a third column for a subfield of the corresponding PPDU field category, and a fourth column for a number of bits (shown as Nbits) in accordance with the subfield of the corresponding PPDU field category. In an embodiment, a U-SIG field may include three categories, for example, a Version Independent category, a Version Dependent category, and a CRC & TAIL category. In such an embodiment, the Version Independent category includes five subfields, for example, a Version identifier subfield with 3-bits, an up-link (UL)/down-link (DL) subfield that includes 1-bit, a Basic Service Set (BSS) color subfield that includes 6-bits, a Transmission Opportunity (TXOP) subfield that includes 7-bits, and a PPDU bandwidth (BW) subfield that includes 3-bits. In such an embodiment, the Version Dependent category includes eight subfields, for example, a PPDU format and Compression subfield that includes 2-bits, a full punctured channel information subfield that includes 6-bits, a Spatial reuse subfield that includes 2-bits, a Guard Interval (GI)+LTF size subfield that includes 2-bits, a Number of LTFs subfield that includes 4-bits, a Number of Space Time Streams (NSTS) subfield that includes 4-bits, a Beamformed subfield that includes 1-bit, and a Reserved subfield that includes 1-bit. In such an embodiment, the CRC & TAIL category includes two subfields, for example, a CRC subfield that includes 4-bits and a TAIL subfield that includes 6-bits. In such an embodiment, the total number of bits for the U-SIG bit table 700 may be 52-bits.

According to the EHT communication protocol, the EHT-SIG field includes a "two subfield" structure to signal PPDU decoding related information, resource unit allocation (RA) information, and per-user information. In addition, according to the EHT communication protocol, subchannel puncturing is supported and the EHT PPDU maximum bandwidth increases to 320 MHz. Furthermore, the U-SIG field in accordance with the EHT communication protocol may support forward compatibility while also including bandwidth information and other related information to signal how to decode the EHT-SIG field. As an example, the U-SIG field in accordance with the EHT communication protocol may need to support and signal channel puncturing information (CPI) as devices (e.g., STAs) may operate in a 5 GHz band or a 6 GHz band. Signaling CPI in the U-SIG field enables Overlapping Basic Service Set (OBSS) channel sharing and indicates which subchannels are available to decode EHT-SIG. Examples of signaling CPI may involve the transmission of some signals associated with a given frame, and the omission of other signals ordinarily associated with the given frame. Encoding bits in a self-contained preamble portion of the packet may help consolidate information while simplifying encoding, decoding, and transmitting processes in accordance with the EHT communication protocol.

A format for an EHT packet that includes CPI, RA information, and PPDU decoding information is described in further detail below with reference to FIG. 8.

Figure 8:
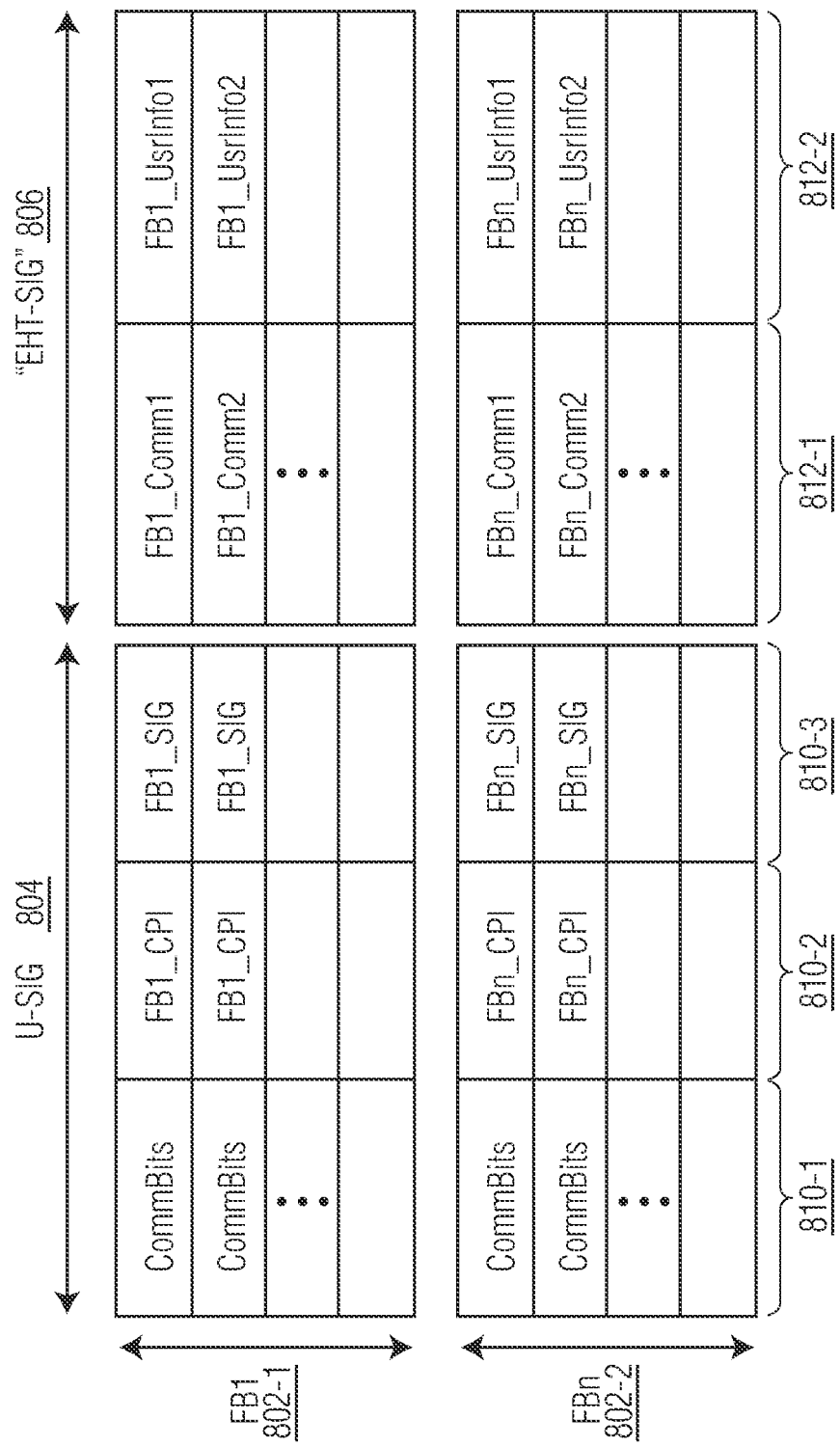
FIG. 8 depicts an example of a preamble portion of a packet in accordance with an embodiment of the invention.

FIG. 8 depicts an example of a preamble portion of a packet in accordance with an embodiment of the invention. In particular, FIG. 8 depicts subfields within a U-SIG field of a preamble and an EHT-SIG field of the preamble that span across multiple frequency blocks of a bandwidth and that may be implemented, for example, in the U-SIG field 210 and the EHT-SIG field 212 of the preamble 200 shown in FIG. 2. With reference to FIG. 8, a U-SIG field 804 and an EHT-SIG field 806, are shown as spanning across a first frequency block, implemented as FB1 802-1, and across a second frequency block, implemented as FBn 802-2, such that "n" may be an integer greater than 1. In some embodiments, a size of the first frequency block and the second frequency block is a design parameter. For example, each frequency block may be 80 MHz or 160 MHz including multiple subchannels (e.g., as shown by the four rows within FB1 802-1 and FBn 802-2), which may each be 20 MHz or 40 MHz.

The U-SIG field 804 as shown in FIG. 8 includes a first U-SIG subfield 810-1 that includes a common information bit field (shown as CommBits), a second U-SIG subfield 810-2 that includes a CPI field related to FB1 802-1 (shown as FB_CPI) and FBn 802-2 (shown as FBn_CPI), and a third U-SIG subfield 810-3 that includes a signal information field related to FB1 802-1 (shown as FB_SIG) and FBn 802-2 (shown as FBn_SIG). Furthermore, the first U-SIG subfield 810-1, the second U-SIG subfield 810-2, and the third U-SIG subfield 810-3 may each include bits that are defined on a per-channel basis and that are repeated within at least one frequency block (e.g., FB1 802-1 or FBn 802-2) of a bandwidth. For example, the first FB1 subchannel (e.g., first row of FB1 802-1) of the U-SIG field 804 may be repeated such that the content of the first FB1 subchannel is implemented in the second FB1 subchannel, the third FB1 subchannel and the fourth FB1 subchannel, respectively.

The EHT-SIG field 806 as shown in FIG. 8 includes a first EHT-SIG subfield 812-1 that includes a common field related to FB1 802-1 (shown as FB1_Comm1 and FB1_Comm2) and FBn 802-2 (shown as FBn_Comm1 and FBn_Comm2), as well as a second EHT-SIG subfield 812-2 that includes a user specific information field related to FB1 802-1 (shown as FB1_UsrInfo1 and FB1_UsrInfo2) and FBn 802-2 (shown as FBn_UsrInfo1 and FBn UsrInfo2). In some embodiments, the first EHT-SIG subfield 812-1 includes RA fields for the OFDMA mode in accordance with the 802.11ax communication protocol. In some embodiments, the second EHT-SIG subfield 812-2 may include MCS for each user (e.g., STA). Furthermore, the first EHT-SIG subfield 812-1 and the second EHT-SIG subfield 812-2 may each include bits that are defined on a two-channel basis and that are repeated within at least one frequency block (e.g., FB1 302-1 or FBn 302-2) of the bandwidth. For example, the first FB1 subchannel (e.g., first row of FB1 802-1) of the EHT-SIG field 806, and the second FB1 subchannel (e.g., second row of FB1 802-1) of the EHT-SIG field 806 may be repeated such that the content of the first FB1 subchannel and the second FB1 subchannel are implemented in the third FB1 subchannel and the fourth FB1 subchannel, respectively.

With reference to FIG. 8, the second U-SIG subfield 810-2 of the U-SIG field 804 that includes the CPI field related to FB1 802-1 (shown as FB1_CPI) and FBn 802-2 (shown as FBn_CPI), may enable full puncture pattern signaling in the non-OFDMA mode and in the OFDMA mode. In some embodiments, the U-SIG field signals CPI for 80 MHz segments within the U-SIG field (e.g., FB1 802-1 or FBn 802-2). For PPDUs less than 80 MHz, a puncture pattern may be fixed without variation, such that either (i) the U-SIG field may be left for implementation specific information in which a receiver may not check, or (ii) there may be fixed puncture pattern information bits for 20 MHz PPDUs and 40 MHz PPDUs. In some embodiments, when there are fixed puncture pattern information bits for 20 MHz PPDUs and 40 MHz PPDU, CPI for 20 MHz PPDUs may be set with only a single occupied subchannel (e.g., in a bitmap signaling [1 0 0 0], the location of "1" indicates the 20 MHz channel location within an 80 MHz segment). In some embodiments, when there are fixed puncture pattern information bits for 20 MHz PPDUs and 40 MHz PPDUs, CPI for 40 MHz PPDUs may be set when a lower 40 MHz channel or a higher 40 MHz channel is occupied (e.g., in a bitmap signaling [1 1 0 0], the location of "1 1" indicates where a primary or secondary 40 MHz channel within an 80 MHz segment is located).

To signal CPI in the non-OFDMA mode, the U-SIG field of the preamble may use K bits to cover each of the allowed punctured patterns for each signal bandwidth. Tables which cover CPI signaling in the non-OFDMA mode using K bits in the U-SIG field of the preamble are described in further detail below with reference to FIGS. 9A-9B.

FIG. 9A is an example of a CPI signaling table that depicts encoding in accordance with an embodiment of the invention. In particular, FIG. 9A depicts a table that represents using K bits in U-SIG field encoding to cover punctured patterns in each frequency block of a bandwidth and which may be implemented in a U-SIG field, for example, U-SIG field 210 of the preamble 200 as shown in FIG. 2. With reference to FIG. 9A, a CPI signaling table 900-1 may include a first column for 80 MHz CPI, a second column for a corresponding puncture pattern, and a third column with a note that indicates the number of encoding options for the 80 MHz CPI and corresponding puncture pattern. In such an embodiment, the 80 MHz CPI for 0 punctured channels may have the corresponding puncture pattern of 996: [1 1 1 1] with a note that indicates 80 MHz has 1 encoding option. In an embodiment, the 80 MHz CPI for 1-4 punctured channels may have the corresponding puncture pattern of 484+242: [1 1 x 1] with a note that indicates 60 MHz has 4 encoding options. In an embodiment, the 80 MHz CPI for 5-7 punctured channels may have the corresponding puncture pattern of 484 (242+242): [1 1 x x] with a note that indicates 40 MHz has 3 encoding options.

FIG. 9B is another example of a CPI signaling table that depicts encoding in accordance with an embodiment of the invention. In particular, FIG. 9B depicts a table that represents using K bits in U-SIG field encoding to cover punctured patterns in each frequency block of a signal bandwidth and which may be implemented in a U-SIG field, for example, U-SIG field 210 of the preamble 200 as shown in FIG. 2. With reference to FIG. 9B, a CPI signaling table 900-2 may include a first column for 160 MHz CPI, a second column for a corresponding puncture pattern, and a third column with a note that indicates the number of encoding options for the 160 MHz CPI and corresponding puncture pattern. In such an embodiment, the 160 MHz CPI for 0 punctured channels may have the corresponding puncture pattern of 996+996: [1 1 1 1] [1 1 1 1] with a note that indicates 160 MHz has 1 encoding option. In an embodiment, the 160 MHz CPI for 1-8 punctured channels may have the corresponding puncture pattern of 996+(484+242): [1 1 1 1] [1 1 x 1] with a note that indicates 140 MHz has 8 encoding options. In an embodiment, the 160 MHz CPI for 21-26 punctured channels may have the corresponding puncture pattern of 996+484 or (242+242): [1 1 1 1][1 1 0 0] with a note that indicates 120 MHz has 6 encoding options. In an embodiment, the 160 MHz CPI for 27-28 punctured channels may have the corresponding puncture pattern of 996+0: [1 1 1 1] [0 0 0 0] with a note that indicates 80 MHz has 2 encoding options, (484+242): [1 1 x 1] with a note that indicates 60<80 MHz has 4 encoding options, or (242+242): [1 x x 1] with a note that indicates 40 MHz has 1 encoding option.

With reference to FIGS. 9A-9B, in some embodiments, K bits may be 3-bits to signal CPI in the non-OFDMA mode when the frequency block may be 80 MHz. In such an embodiment, 8 options may be needed, such that 996 may include 1 option, 484+242 may include 4 options, 484 may include 2 options, and 242+242 may include 1 option. In some embodiments, K bits may be 5-bits or 6-bits to signal CPI in the non-OFDMA mode when the frequency block may be 160 MHz. In such an embodiment, 6-bits may be sufficient. However, as less than 80 MHz bandwidth may only occupy one 80 MHz segment, corresponding options may be reused for two 80 MHz segments, allowing 5-bits to be sufficient. In such an embodiment, 60 MHz puncture patterns may reuse indices (e.g., numbers corresponding to channels within a frequency block) for corresponding (484+ 242)+996 options, 40 MHz (242+242) puncture patterns may reuse indices for corresponding (242+242)+996 options, and 40 MHz (484) or 20 MHz (242) may not have a puncture pattern.

To signal CPI in the OFDMA mode, the U-SIG field of the EHT signaling fields may include a 20 MHz bitmap to signal punctured patterns in each frequency block within the signal bandwidth. In some embodiments, when the frequency block is 80 MHz, a 4-bit bitmap is needed (e.g., [1111] for 80 MHz or [1101] for 60 MHz). In some embodiments, when the frequency block is 160 MHz, an 8-bit bitmap is needed (e.g., [1111][1111] for 160 MHz and [1110][0111] for 120 MHz).

In accordance with the 802.11ax communication protocol, only continuous RU users are supported for each user in a bandwidth. To signal RU allocation, the 802.11ax communication protocol implements encoding represented by an 8-bit RA table for a High Efficiency Signal B (HE-SIGB) field of a preamble. However, in accordance with the 802.11be communication protocol and future communication protocols, non-continuous RU users may be supported in a 320 MHz bandwidth and multi-RU modes need to be in RA table entries. Consequently, only 52 entries remain in the 8-bit RA table that is in accordance with the 802.11ax communication protocol. To support non-continuous RU users and multi-RU modes in accordance with the 802.11be communication protocol, a new RA table, implemented as a 9-bit RA table, is used to represent the signaling of single-RU modes and multi-RU modes. In some embodiments, the 9-bit RA table may be designed by appending a 0-bit prefix to the existing 8-bit RA table. In such an embodiment, existing allowed single-RU modes may be signaled by a "0 RA8", such that 0 may be the 0-bit prefix and RA8 may be a corresponding 8-bit RA table index. In such an embodiment, multi-RU modes may be signaled in an EHT-SIG common field (e.g., first EHT-SIG subfield 812-1) of an EHT-SIG field (e.g., EHT-SIG field 806) via the remaining undefined entries. As an example, RUs greater than or equal to 242 may allow 16 users and RUs less than 242 may only allow one user per-RU. As another example, RUs greater than 484 may allow 16 users and RUs less than 242 may allow one user per-RU. Thus, the representative encoding content of the 9-bit RA table may be implemented in the EHT-SIG common field of the EHT-SIG field to signal multi-RU modes and single-RU modes in up to 320 MHz of bandwidth.

A 9-bit RA table that represents encoding for signaling single-RU modes and multi-RU modes in accordance with an embodiment of the invention is described in further detail below with reference to FIG. 10 and FIGS. 11A-11C.

FIG. 10 is an example of a 9-bit RA signaling table that depicts encoding in accordance with an embodiment of the invention. In particular, FIG. 10 depicts a table that represents an overview of bits in an EHT-SIG common field (e.g., as shown in the first EHT-SIG subfield 812-1) encoding to cover single-RU modes and multi-RU modes of a bandwidth and which may be implemented in the EHT-SIG field, for example, EHT-SIG field 212 of the preamble 200 as shown in FIG. 2. With reference to FIG. 10, a 9-bit RA signaling table 1000 may include a first column depicting a prefix bit and 8 RA bit of the 9-bit RA, a second column for a corresponding RU allocation, and a third column for the number of entries corresponding with the 9-bits and RU allocation. In such an embodiment, three rows of the 9-bit RA signaling table 1000 represent encoding for RU allocations in accordance with the 802.11ax communication protocol, which reuses entries from the 8-bit RA table. In such an embodiment, three rows of the 9-bit RA signaling table 1000 represent encoding for new RU allocation in accordance with the 802.11be communication protocol which may use 0 or 1 as a prefix bit for the 9-bit RA signaling. In some embodiments, when the prefix bit of the 9-bit RA signaling table 1000 is 0, an existing RA combination (e.g., as specified in the 802.11ax communication protocol) is utilized.

With reference to FIG. 10, the 9-bit RA signaling table 1000 may need 57 entries for small RUs and 200 entries for large RUs. In some embodiments, for small RUs, [52+26] may need 25 entries. In some embodiments, for small RUs, [106+26, 106] or [106, 106+26] may need 128 entries, but may be reduced to 32 entries. In some embodiments, 200 entries may be needed for [242+242], [484+242, 242] or [242, 242+484], [484+[ ]+242, 242] or [242, 242+[ ]+484], [484, 484+(484+242)] or [484, 484+(242+484)] (16 options), and [996+484], [996+[ ]+484], [484+996], or [484+[ ]+996]. In such an embodiment, "H" may be a gap in RUs.

FIGS. 11A, 11B, and 11C are another example of a 9-bit RA signaling table that depicts encoding in accordance with an embodiment of the invention. In particular, FIGS. 11A, 11B, and 11C depict a table that represents bits in an EHT-SIG common field (e.g., as shown in the first EHT-SIG subfield 812-1) encoding to cover single-RU modes and multi-RU modes of a bandwidth and which may be implemented in the EHT-SIG field, for example, EHT-SIG field 212 of the preamble 200 as shown in FIG. 2. With reference to FIGS. 11A, 11B, and 11C, a 9-bit RA signaling table 1100 may include a first column depicting a prefix bit of the 9-bit RA signaling table 1100, a second column depicting 8-bit indices of the 9-bit RA signaling table 1100, a set of columns (column 3 to column 11) that represent RU allocations, and a twelfth column that indicates the number of entries for the corresponding RU allocations.

The EHT communication protocol may add more MCS levels, for example, 4096 Quadrature Amplitude Modulation (4096-QAM) and dual-carrier modulation (DCM) for MCSO modulation. In an embodiment, a lower rate may be defined for low-power indoor (LPI) operation, such that the lower rate may be MCSO DCM with two times duplicate (2×DUP). In some embodiments, MCS may be signaled in an EHT-SIG field (e.g., EHT-SIG field 212) of a packet. In such an embodiment, each MCS may be encoded via a 4-bit field. For example, encoding MCS 0-11 may be performed as specified by the 802.11ax communication protocol, encoding MCS 12 may be performed by 4096QAM with a code rate of 3/4, encoding MCS 13 may be performed by 4096QAM with a code rate of 5/6, encoding MCS 14 may be performed by Binary Phase Shift Keying (BPSK) minus 1/2 DCM with 2×DUP, and encoding MCS 15 may be performed by BPSK minus 1/2 DCM.

Figure 12:
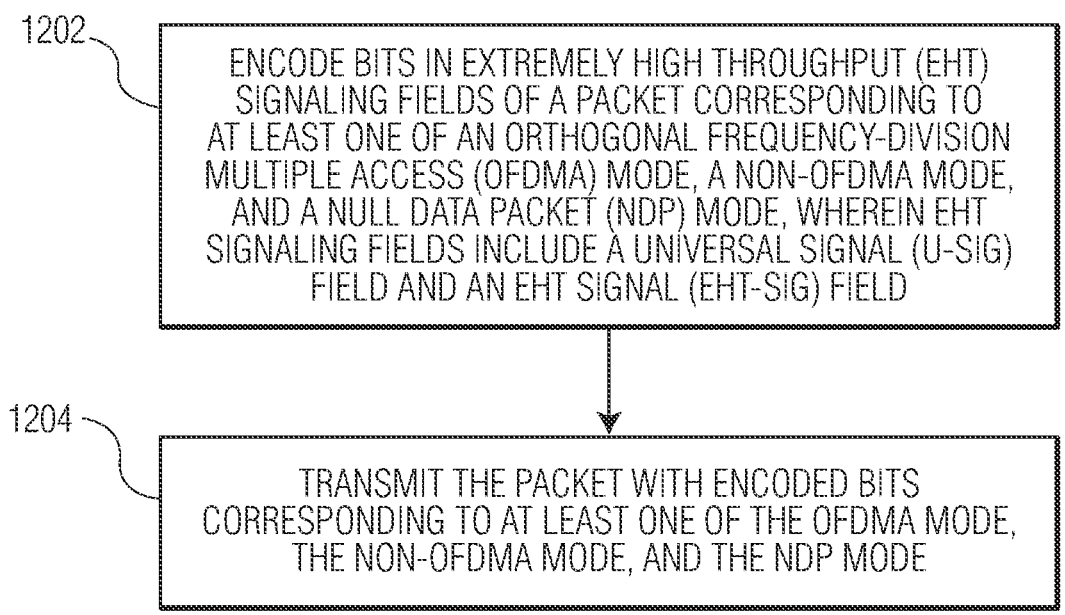
FIG. 12 illustrates a flow diagram of a technique for wireless communication in accordance with an embodiment of the invention.

FIG. 12 illustrates a flow diagram of a technique for wireless communication in accordance with an embodiment of the invention. At block 1202, bits are encoded in EHT signaling fields of a packet corresponding to at least one of an OFDMA mode, a non-OFDMA mode, and a NDP mode, in which EHT signaling fields include a U-SIG field and an EHT-SIG field. At block 1204, the packet with encoded bits corresponding to at least one of the OFDMA mode, the non-OFDMA mode, and the NDP mode is transmitted.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for wireless communications, the method comprising:

encoding bits in Extremely High Throughput (EHT) signaling fields of a packet corresponding to at least one of an Orthogonal Frequency-Division Multiple Access (OFDMA) mode, a non-OFDMA mode, and a Null Data Packet (NDP) mode, wherein the EHT signaling fields include a Universal signal (U-SIG) field and an EHT signal (EHT-SIG) field, and wherein the bits included in subfields of the U-SIG field and the EHT-SIG field are repeated within at least one frequency block of a packet bandwidth; and transmitting the packet with encoded bits corresponding to at least one of the OFDMA mode, the non-OFDMA mode, and the NDP mode;

wherein for the OFDMA mode, the EHT-SIG field of the packet includes an EHT-SIG common field that is comprised of one Binary Convolutional Code (BCC) code block when a bandwidth is at most 80 MHz, wherein one BCC code block is comprised of a U-SIG Overflow bits subfield and a Resource Unit (RU) Allocation bits subfield;

wherein when the bandwidth is greater than 80 MHz, the EHT-SIG common field is comprised of two BCC code blocks that include a cyclic redundancy check (CRC) and a tail added to each BCC code block, and wherein a first BCC code block of the two BCC code blocks is comprised of a U-SIG Overflow bits subfield and a K RU Allocation subfield, and a second BCC code block of the two BCC code blocks is comprised of an (N−K) RU Allocation subfield; and wherein K represents a positive integer, N represents an integer greater than K, and (N−K) represents N minus K.

2. The method of claim 1, wherein for the non-OFDMA mode, the EHT-SIG common field and a first user block are encoded in the one Binary Convolutional Code (BCC) code block with the CRC and the tail added to the BCC code block;

wherein the EHT-SIG field of the packet fits into two Orthogonal Frequency-Division Multiplexing (OFDM) symbols with MCSO modulation; and wherein the MCSO modulation represents a Modulation and Coding Scheme (MCS) with an MCS index of 0.

3. The method of claim 1, wherein for the NDP mode, the EHT-SIG field of the packet is comprised of the one Binary Convolutional Code (BCC) code block if an EHT-SIG symbol exists;

wherein the EHT-SIG field fits into one OFDM symbol for MCSO modulation; and wherein the MCSO modulation represents a Modulation and Coding Scheme (MCS) with an MCS index of 0.

4. The method of claim 1, wherein the U-SIG field of an EHT Physical layer Protocol Data Unit (PPDU) indicates EHT-SIG decoding information, and wherein EHT-SIG decoding information includes channel puncturing information (CPI).

5. The method of claim 4, wherein the U-SIG field of the EHT PPDU includes U-SIG PPDU format and Compression bits to indicate PPDU formats and the EHT-SIG field structure; and wherein the U-SIG PPDU format and Compression bits includes 2-bits.

6. The method of claim 1, wherein the EHT-SIG field of an EHT NDP PPDU is comprised of at least one of zero symbols and one symbol; and wherein the EHT-SIG field of the EHT NDP PPDU includes bits that do not fit in the U-SIG field.

7. The method of claim 1, wherein for the non-OFDMA mode, the EHT signaling fields use K bits included in the U-SIG field to signal a puncturing pattern for an entire signal bandwidth, where K represents a positive integer.

8. The method of claim 1,
wherein for the OFDMA mode, the EHT signaling fields include a 20 MHz bitmap to signal the puncturing pattern in each frequency block within a signal bandwidth, and
wherein the 20 MHz bitmap is included in the U-SIG field.

9. The method of claim 8,
wherein to signal an 80 MHz frequency block, the 20 MHz bitmap uses 4-bits to signal an 80 MHz frequency block and uses 8-bits to signal a 160 MHz frequency block.

10. The method of claim 1,
wherein the method further comprises signaling resource unit allocation (RA) information in the EHT-SIG field of the packet for at least one of multi-resource unit (RU) modes and single-RU modes.

11. The method of claim 10,
wherein the EHT-SIG field of the packet uses a 9-bit resource unit allocation (RA) table comprised of 9-bits to signal at least one of the multi-RU modes and the single-RU modes.

12. The method of claim 11,
wherein 1-bit of the 9-bit resource unit allocation (RA) table is a prefix bit.

13. The method of claim 12,
wherein the prefix bit of the 9-bit resource unit allocation (RA) table is 0; and
wherein 8-bits of the 9-bit RA table use entries as specified in an 802.11ax communication protocol.

14. A first wireless device, the first wireless device comprising:
a processor configured to:
encode bits in Extremely High Throughput (EHT) signaling fields of a packet corresponding to at least one of an Orthogonal Frequency-Division Multiple Access (OFDMA) mode, a non-OFDMA mode, and a Null Data Packet (NDP) mode,
wherein the EHT signaling fields include a Universal signal (U-SIG) field and an EHT signal (EHT-SIG) field, and
wherein the bits included in subfields of the U-SIG field and the EHT-SIG field are repeated within at least one frequency block of a packet bandwidth; and
transmit the packet with encoded bits corresponding to at least one of the OFDMA mode, the non-OFDMA mode, and the NDP mode;
wherein for the OFDMA mode, the EHT-SIG field of the packet includes an EHT-SIG common field that is comprised of one Binary Convolutional Code (BCC) code block when a bandwidth is at most 80 MHz,
wherein one BCC code block is comprised of a U-SIG Overflow bits subfield and a Resource Unit (RU) Allocation bits subfield;
wherein when the bandwidth is greater than 80 MHz, the EHT-SIG common field is comprised of two BCC code blocks that include a cyclic redundancy check (CRC) and a tail added to each BCC code block, and wherein a first BCC code block of the two BCC code blocks is comprised of a U-SIG Overflow bits subfield and a K RU Allocation subfield, and a second BCC code block of the two BCC code blocks is comprised of an (N−K) RU Allocation subfield; and
wherein K represents a positive integer, N represents an integer greater than K, and (N−K) represents N minus K.

15. A method for wireless communications, the method comprising: in a punctured transmission,
encoding bits in Extremely High Throughput (EHT) signaling fields of a packet corresponding to at least one of an Orthogonal Frequency-Division Multiple Access (OFDMA) mode, a non-OFDMA mode, and a Null Data Packet (NDP) mode,
wherein the EHT signaling fields include a Universal signal (U-SIG) field and an EHT signal (EHT-SIG) field, and
wherein the bits included in subfields of the U-SIG field and the EHT-SIG field are repeated within at least one frequency block of a packet bandwidth; and
transmitting the packet with encoded bits corresponding to at least one of the OFDMA mode, the non-OFDMA mode, and the NDP mode;
wherein for the OFDMA mode, the EHT-SIG field of the packet includes an EHT-SIG common field that is comprised of one Binary Convolutional Code (BCC) code block when a bandwidth is at most 80 MHz,
wherein one BCC code block is comprised of a U-SIG Overflow bits subfield and a Resource Unit (RU) Allocation bits subfield;
wherein when the bandwidth is greater than 80 MHz, the EHT-SIG common field is comprised of two BCC code blocks that include a cyclic redundancy check (CRC) and a tail added to each BCC code block, and wherein a first BCC code block of the two BCC code blocks is comprised of a U-SIG Overflow bits subfield and a K RU Allocation subfield, and a second BCC code block of the two BCC code blocks is comprised of an (N−K) RU Allocation subfield; and
wherein K represents a positive integer, N represents an integer greater than K, and (N−K) represents N minus K.

16. The method of claim 1,
wherein the bits included in the subfields of the U-SIG field are repeated on a per-channel basis within the at least one frequency block.

17. The method of claim 16,
wherein the bits included in the subfields of the U-SIG field that are repeated on the per-channel basis within the at least one frequency block indicate channel puncturing information (CPI) for the at least one frequency block and enable Overlapping Basic Service Ser (OBSS) channel sharing.

18. The method of claim 1,
wherein the bits included in the subfields of the EHT-SIG field are repeated on a two-channel basis within the at least one frequency block.

19. The method of claim 1,
wherein the bits included in the subfields of the U-SIG field enable full puncture pattern signaling in the non-OFDMA mode and in the OFDMA mode.

* * * * *